H. FAUROT, Jr.
WINDOW MOUNTING DEVICE.
APPLICATION FILED APR. 17, 1922.
1,422,951. Patented July 18, 1922.
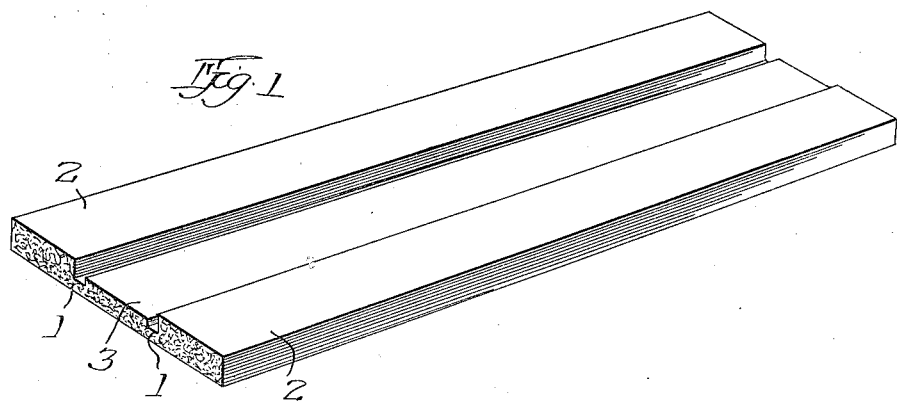
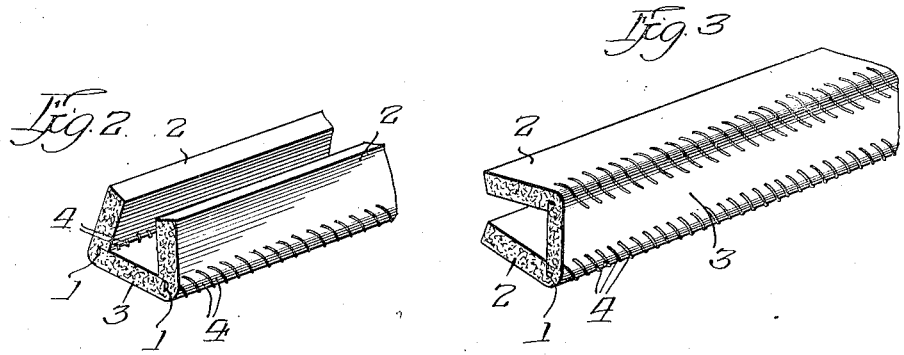
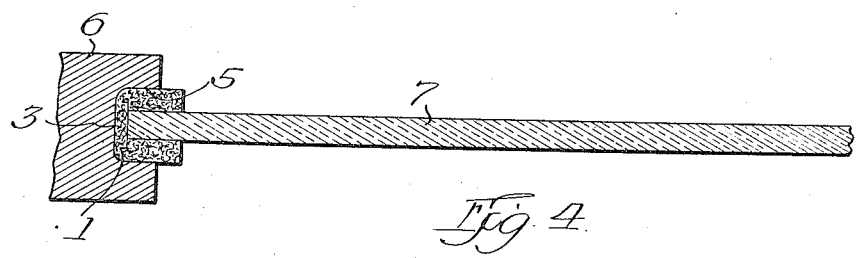
Inventor
Henry Faurot Jr.
By Allen M. Reed
Atty
Witness:

UNITED STATES PATENT OFFICE.

HENRY FAUROT, JR., OF CHICAGO, ILLINOIS, ASSIGNOR TO WESTERN FELT WORKS, OF CHICAGO, ILLINOIS, A CORPORATION OF WEST VIRGINIA.

WINDOW-MOUNTING DEVICE.

1,422,951.  Specification of Letters Patent.  Patented July 18, 1922.

Application filed April 17, 1922. Serial No. 554,155.

*To all whom it may concern:*

Be it known that I, HENRY FAUROT, Jr., a citizen of the United States, and resident of Chicago, in the county of Cook and State of Illinois, have invented a certain new and useful Improvement in Window-Mounting Devices, of which the following is a full, clear, concise and exact description, reference being had to the accompanying drawings, forming a part of this specification.

The present invention relates to window mounting devices and its principal object is the provision of a device that will form an efficient mounting for glass windows subject to vibration, as in an automobile, and which may be economically manufactured. One form of the invention is illustrated and described herein.

In the drawings,—

Figure 1 is a perspective view of a strip of material in the form that the device appears in one stage of manufacture.

Figures 2 and 3 are perspective views of the device.

Figure 4 illustrates the device applied to a window.

The device comprises a channeled strip of flexible material adapted to be seated in the channel of a window frame. In manufacturing the device a single integral strip of flexible material, preferably felt, is provided with longitudinal grooves 1 along which the felt may be bent to form a channeled strip consisting of side walls 2 and a bottom wall 3. Preferably that portion of the strip which is to form the bottom wall 3 is planed down to a less thickness than the side walls 2 so that when the side walls are bent up their edges adjacent the grooves 1 will contact with the inner surface of the bottom wall 3. After the side walls 2 have been bent up substantially at right angles with the bottom wall 3 they are bound to the bottom wall by sewing a thread 4 around the outer edge of the juncture of the side and bottom walls and through the adjacent portions of the bottom and side walls, as clearly illustrated in Figures 2 and 3. The juncture is bound so that it is reinforced and also tightly enough so that the reinforcing binding causes the side walls 2 to tend to approach each other.

In use, the base of the channeled strip of felt is seated in a channel 5 formed in a window frame 6 but with the side walls 2 projecting beyond the outer edges of the channel 5 in the frame. A glass pane 7 is then seated in the channel formed by the bottom wall 3 and the side walls 2 of the flexible strip. The reinforcement of the juncture between the side and bottom walls of the strip and the forcing of the side walls toward each other assures the flexible strip retaining its shape and closely and effectively hugging the glass at all times.

Having thus described my invention, what I claim as new and desire to secure by Letters Patent of the United States is:—

A window mounting device, comprising a single normally flat strip of felt formed with parallel longitudinal grooves, the portion of the strip between the grooves being thinner than the portions between the grooves and the lateral edges, the strip being bent along said grooves into channeled form and adapted to have its base inserted in a channeled frame, the side walls of the strip being sewed to the bottom wall so as to reinforce the junctions of said walls and cause the side walls to tend to approach each other.

In witness whereof, I hereunto subscribe my name this 12 day of April, 1922.

HENRY FAUROT, JR.